L. A. TRULL.
WAVE MOTION MOTOR.
APPLICATION FILED DEC. 5, 1912.

1,078,323.

Patented Nov. 11, 1913.

Witnesses:
H. B. Davis
C. Doyle

Inventor:
Lyman A. Trull
by Hayes & Harriman
attys.

COLUMBIA PLANOGRAPH CO., WASHINGTON, D.

UNITED STATES PATENT OFFICE.

LYMAN A. TRULL, OF MANCHESTER, NEW HAMPSHIRE.

WAVE-MOTION MOTOR.

1,078,323.   Specification of Letters Patent.   Patented Nov. 11, 1913.

Application filed December 5, 1912.   Serial No. 735,027.

*To all whom it may concern:*

Be it known that I, LYMAN A. TRULL, a citizen of the United States, residing at Manchester, in the county of Hillsboro and State of New Hampshire, have invented an Improvement in Wave-Motion Motors, of which the following is a specification.

This invention relates to improvements in wave-motors.

The object of the invention is to provide a self-contained power generator which can be anchored at any desired locality and which will be actuated by the up-and-down motion of the waves to compress air, or under certain conditions could pump water.

I will describe my invention in the following specification and will point out the novel features thereof in the appended claims.

Figure 1:
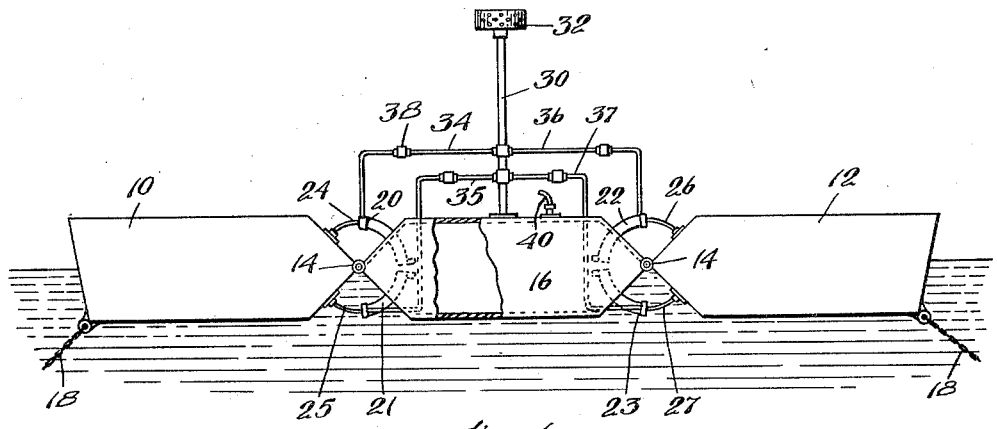
Figure 2:
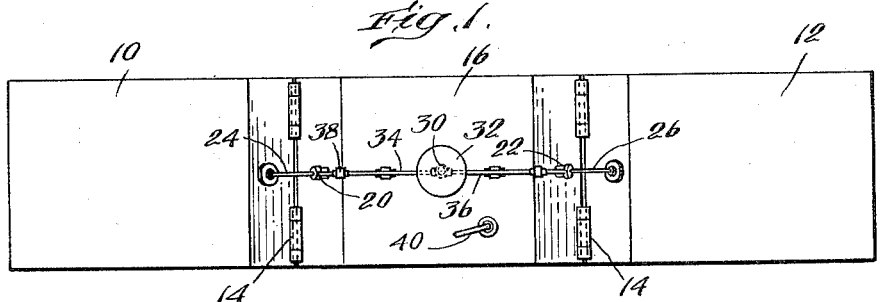
Figure 3:
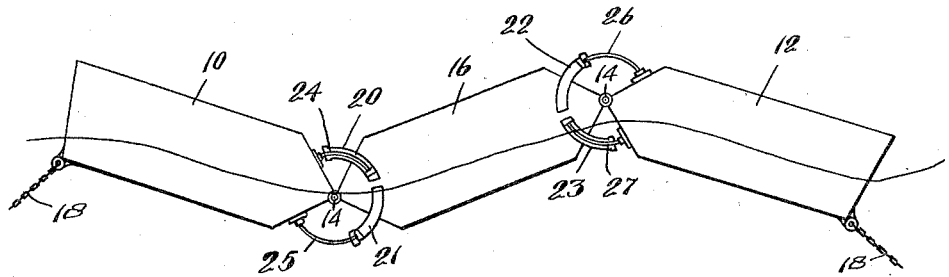

In the accompanying drawing, Figure 1 is a side elevation of a preferred embodiment of the invention with the parts in the position assumed when there are no waves, Fig. 2 is a plan view of the same, and, Fig. 3 is a partial side elevation showing the parts in action.

As illustrated in the drawing the invention comprises a plurality of floats 10, 12, connected by hinges 14 to an intermediate tank 16, so that they may have relative up-and-down motion, due to the action of the waves, as illustrated in Fig. 3. The floats are adapted to be anchored in any suitable locality by chains or cables 18 connected to suitable anchors, not shown. The contiguous ends of the tank and floats are tapered to enable the relative up-and-down motion to take place.

Mounted upon the inclined ends of the air tank 16 are compressor cylinders 20, 21 22 and 23, provided with pistons having piston rods 24, 25, 26, 27, respectively connected at one end to the adjacent inclined end of one of the floats. The cylinders and piston-rods are here shown curved longitudinally on the arc of a circle.

As the compressors are immersed almost continuously, it is necessary or desirable to provide an air-inlet therefor which is above the waves and spray. Accordingly, an air-inlet pipe 30 is mounted on the tank 16 provided with a perforated hood 32 at its upper end. The pipe 30 is connected to the compressor cylinders 20, 21, 22, 23 by pipes 34, 35, 36 and 37, respectively, each of said pipes being provided with a check-valve 38. The pipes 34, 35, 36 and 37 are connected to the outer ends of the respective cylinders, and the inner ends of said cylinders communicate with the tank 16, usual clack-valves being employed. A pipe 40, preferably a flexible hose pipe, is connected to the tank 16, and this pipe is adapted to convey the compressed air to any desired point for utilization.

From the construction above set forth, it will be noted that the air-supply pipes and compressor cylinders are all mounted on the tank 16 in rigid relation, while the pistons are so connected and formed that the floats 10 and 12 are free to oscillate with relation to said tank. The cylinders are located on opposite sides of the horizontal median plane of the apparatus, so that one set of pistons is always active when the parts are in motion.

I claim:—

1. A wave motor, comprising a floating tank, a float movably connected therewith, and oppositely-acting fluid compressors arranged between and operatively connected to the float and tank.

2. A wave motor, comprising a floating tank, a float having hinged connection therewith, and oppositely-acting fluid compressors arranged between said tank and float, the operative elements of each compressor being connected respectively to the tank and to the float.

3. A wave motor, comprising a floating tank, a float having hinged connection therewith, and oppositely-acting fluid compressors arranged between said tank and float, each of said compressors including a cylinder carried by and opening within the tank and a piston and rod therefor carried by the float.

4. A wave motor, comprising a floating tank, a float movably connected therewith, oppositely-acting fluid compressors arranged between and operatively connected to the float and tank, and an air supply for said compressors opening above the motor.

5. A wave motor, including a tank, one end of the tank having inclined meeting surfaces, a cylinder secured to one of said surfaces and projecting therebeyond, a float having one end formed to provide inclined meeting surfaces, means movably connecting the tank and float on the line of juncture of their respective end surfaces, and a piston rod operative within the cylinder and carried by one of the inclined end surfaces of the tank.

6. A wave motor, including a tank, one end of the tank having inclined meeting surfaces, a cylinder secured to one of said surfaces and projecting therebeyond, a float having one end formed to provide inclined meeting surfaces, means movably connecting the tank and float on the line of juncture of their respective end surfaces, and a piston rod operative within the cylinder and carried by one of the inclined end surfaces of the tank, said cylinder opening within the tank, and the cylinder and rod being curved concentric with the connection between the tank and float.

In testimony whereof, I have signed my name to this specification, in the presence of two subscribing witnesses.

LYMAN A. TRULL.

Witnesses:
  ELIZABETH K. HARVEY,
  MOODYBELL S. BENNETT.

---

Copies of this patent may be obtained for five cents each, by addressing the "Commissioner of Patents, Washington, D. C."